United States Patent [19]

Shedrow

[11] Patent Number: 4,542,965
[45] Date of Patent: Sep. 24, 1985

[54] SUCTION CUP MOUNT FOR EYEGLASSES

[76] Inventor: Sidney Shedrow, 202 E. Gaston St., Savannah, Ga. 31401

[21] Appl. No.: 459,414

[22] Filed: Jan. 20, 1983

[51] Int. Cl.$^4$ .......................... G02C 7/08; G02C 9/02; G02C 5/04
[52] U.S. Cl. ........................................ 351/57; 351/47; 351/59; 351/128
[58] Field of Search ...................... 351/47, 48, 57, 58, 351/59, 128

[56] References Cited

U.S. PATENT DOCUMENTS 2,818,774  1/1958  Olnhauser ............................. 351/57
3,236,579  2/1966  Evans .................................... 351/47

Primary Examiner—Rodney B. Bovernick
Attorney, Agent, or Firm—James B. Middleton

[57] ABSTRACT

An eyeglass mounting structure for temporarily securing eyeglasses within a protective mask. The eyeglasses include a frame having a bridge between the lenses, and a plastic hinge connects the hinge to a carrier. A suction cup has a screw extending therefrom, and holes in the carrier allow the screw to be threaded into the carrier. More than one such hole will allow adjustable placement of the eyeglasses with respect to the suction cup.

Further, the bridge is made thin to act as a hinge and allow the eyeglasses to be partially folded to fit within a curved mask. The hinge is bifurcated to allow easy folding without requiring lateral bending of the hinge.

3 Claims, 3 Drawing Figures

SUCTION CUP MOUNT FOR EYEGLASSES

FIELD OF THE INVENTION

This invention relates generally to eyeglass mounting means, and is more particularly concerned with means for mounting eyeglasses in a protective mask or the like through the use of a readily releasable mounting means providing for both vertical and pantoscopic adjustment of the eyeglasses.

BACKGROUND OF THE INVENTION

Eyeglass mounting means are known in the art whereby a person's individual lenses can be mounted within a protective mask or the like so the person can see clearly while wearing the mask. Though several forms of mounting means have been devised, most of the prior art mounting means have little or no adjustability with respect to the wearer. There is one prior device utilizing a releasable means, in the form of a suction cup to hold eyeglasses within a mask, but this device comprises simply a suction cup stuck to the face plate with flexible wires extending from the suction cup to be received in the normal hinge pin holes. The result is, then, that the eyeglasses are intended to rest on the bridge of the nose of the wearer in the same fashion as if the person were wearing eyeglasses with temple pieces, but the temple pieces are removed and the hinge pins are replaced by the support wires. Obviously, this allows virtually no variation of the eyeglasses with respect to the wearer, and requires the somewhat uncomfortable arrangement of having the eyeglasses rest on the nose of the wearer. The eyeglasses must actually rest on the wearer's nose or the eyeglasses will bounce, since they are held only by rather flexible wires.

The present invention utilizes the eyeglass frame somewhat as disclosed in the patent to the same inventor, U.S. Pat. No. 4,349,251, issued Sept. 14, 1982. The disclosure in that patent is incorporated herein by reference. In that patent, it will be seen that the eyeglasses include generally conventional eyeglass frames having a carrier hinged to the eyeglass frames so the eyeglasses are supported by the carrier rather than by the wearer's nose. While the above mentioned patent provides a device admirably adapted to be mounted within a face mask, the device achieving both vertical adjustability and pantoscopic adjustability, the device requires a relatively permanent attachment to the face plate of the mask. Additionally, the use of the separate attaching means renders the device somewhat expensive. Thus, it has been found desirable to provide eyeglass mounting means for a protective mask wherein the mounting means can be quickly applied to a mask and easily removed therefrom, but still providing the adjustable features, and of course providing an economical product.

SUMMARY OF THE INVENTION

The present invention overcomes the above mentioned and other difficulties with the prior art by providing, in combination with an eyeglass frame having a carrier hinged thereto, a quickly releasable attaching means to be received by the face plate of the protective mask. The carrier is vertically adjustable with respect to the attaching means to allow for vertical adjustability of the eyeglass with respect to the wearer, and the hinge by which the carrier is fixed to the eyeglass frames allows pantoscopic adjustment. Furthermore, the eyeglass frames include a bendable bridge member so the eyeglasses are readily adaptable to masks having curved face plates and the like. In the embodiment of the invention here presented, the attaching means is a suction cup which allows quick and easy placement and removal of the eyeglasses in virtually any mask.

BRIEF DESCRIPTION OF THE DRAWINGS

These and other features and advantages of the present invention will become apparent from consideration of the following specification when taken in conjunction with the accompanying drawings in which.

DESCRIPTION OF AN EMBODIMENT OF THE INVENTION

Figure 1:
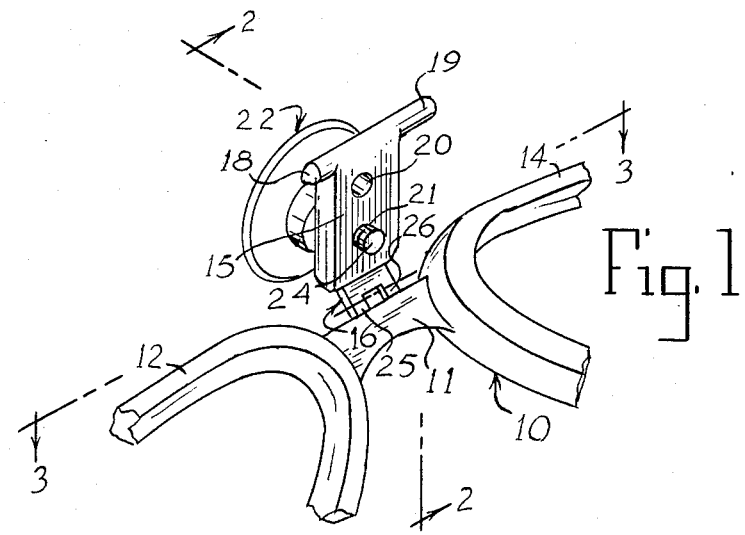
FIG. 1 is a perspective view showing the mounting means of the present invention, the eyeglass frames being partially broken away.

Referring now more particularly to the drawings, and to that embodiment of the invention here presented by way of illustration, FIG. 1 illustrates an eyeglass frame 10 having a bridge 11 extending between the two lens portions 12 and 14. There is a carrier 15 having a hinge member 16 connected between the carrier 15 and the bridge 11.

The upper portion of the carrier 15 is provided with tabs 18 and 19 which will be understood from the disclosure in the above identified patent. It will therefore be understood that the eyeglass frame 10 wih the attached carrier 15 is substantially the same as the structure disclosed in the above-identified patent; and, even though there are some modifications shown herein, the eyeglasses 10 are still usable in conjunction with an attaching means as disclosed in said prior patent.

It will also be seen in FIG. 1 of the drawings that there is a pair of holes 20 and 21 extending through the carrier 15. Two such holes are here illustrated, and two will be sufficient in most cases; however, it will be readily understood by those skilled in the art that additional holes such as holes 20 and 21 may be provided if desired, and the holes may be laterally spaced in the event some lateral adjustment is found to be necessary or desirable.

FIG. 1 of the drawings also illustrates a suction cup generally designated at 22, the suction cup including a stud 24 extending generally centrally therefrom, the stud 24 being here shown as passing through the hole 21 in the carrier 15.

At this point, it should be understood that the eyeglasses 10 would normally be made of a plastic material, and the preferable material is nylon or some similarly tough and durable thermoplastic. Due to the nature of the material, the holes 20 and 21 can be drilled or otherwise formed with a diameter substantially equal to the minor diameter of the stud 24, the stud 24 being a conventional machine screw. With this arrangement, when the carrier 15 is to be placed on the stud 24, the stud 24 can simply be threaded into one of the holes 20 or 21. Since the plastic material of the carrier 15 is considerably softer than the material of the screw 24, the stud will deform the material of the carrier 15 to provide threads so the carrier 15 will be threadedly secured to the stud 24.

Looking further at the hinge 16 in FIG. 1 of the drawings, it will be seen that the lower portion of the hinge 16 is bifurcated so there are two legs as points of connection indicated at 25 and 26 between the hinge 16 and the bridge 11. This bifurcated hinge allows for folding of the eyeglasses as will be discussed in more detail hereinafter.

Figure 2:
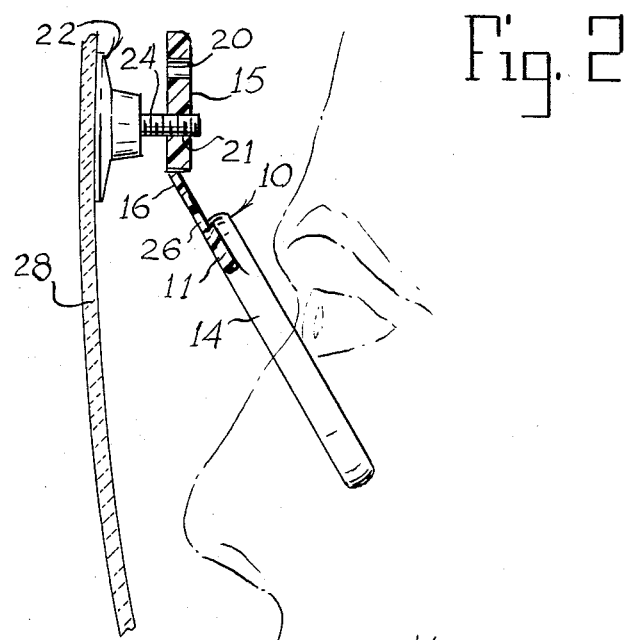
FIG. 2 is a cross-sectional view taken substantially along the line 2—2 in FIG. 1; and, FIG. 3 is a cross-sectional view taken substantially along the line 3—3 in FIG. 1.

Looking now at FIG. 2 of the drawings, it will be seen that the face plate 28 of a protective mask is illustrated, the suction cup 22 being fixed to the face plate 28 with the stud 24 extending therefrom. The eyeglasses 10 are here shown in an edge view so that the pantoscopic angle is readily apparent.

Also in FIG. 2, it will be seen that the entire carrier 15, hinge 16 and bridge 11 are shown in cross-section so the relative thicknesses of the pieces can be observed. In the prior device as disclosed in the previous patent, the bridge 11 is quite thick which renders adjustment of the bridge difficult. In the present invention, the bridge 11 has been made substantially thinner to allow successful adjustment of the angle of the bridge 11. Though not intended to be slavishly followed, and not intended to limit the scope of the present invention, the bridge was previously slightly over 4 mm thick, and is reduced to slightly over 2 mm in the present invention.

Figure 3:
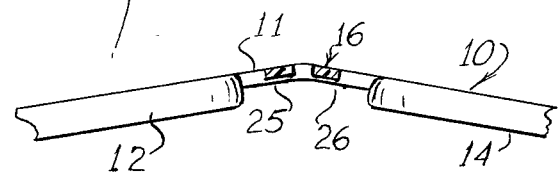

Looking at FIGS. 1 and 2 of the drawings, it will be readily noted that the hinge 16 can be bent to change the pantoscopic angle depending on the individual and the individual's physiognomy. It will also be noted, especially in FIG. 1, that the hinge 16 is wide enough, and formed integrally with the bridge 11, that the hinge 16 will have to be bent transversely in order to curve the frame 10. Because of this, the hinge 16 has been bifurcated as previously stated, the result being best illustrated in FIG. 3 of the drawings. In FIG. 3 it will be seen that the bridge 11 can be bent so that the lens frames 12 and 14 are angularly related. The hinge 16 is shown in cross-section, so that the legs 25 and 26 of the bifurcated portion of the hinge 16 are shown in cross-section. It will therefore be readily understood by those skilled in the art that the bifurcation of the hinge 16 provides the two separate pieces, or legs, 25 and 26 at the point of connection to the bridge 11. Because of this structure, when the bridge 11 is curved as shown in FIG. 3, the legs 25 and 26 are readily displaced, and there is no necessity to make a lateral bend in the main body of the hinge 16.

From the foregoing description, the operation of the device should now be understandable. Looking primarily at FIGS. 1 and 2 of the drawings, it will be understood that one would have the frame 10 with the carrier 15 and hinge 16 connected thereto, and the suction cup 22. The stud 24 extending from the suction cup 22 can be threaded into one of the holes 20 or 21 so the carrier 15 is supported from the suction cup 22. With especial attention to FIG. 2 of the drawings, it will be seen that the frame 10 can be moved closer to the face plate 28, or farther therefrom, by threading the stud 24 into the hole in the carrier 15, or threading the stud out of the hole. Also, the placement of the suction cup 22 on the face plate 28 will allow some variation in placement of the eyeglasses; however, it will be understood that the suction cup 22 will preferably be placed generally at the top of the face plate 28 so the suction cup 22 will not obstruct the vision of the user. If the eyeglasses 10 are too high, it would be preferable to remove the stud 24 from the hole 21, and place the stud 24 in the hole 20, thereby lowering the eyeglasses 10 with respect to the wearer.

In order to adjust the pantoscopic angle of the eyeglasses 10, the hinge 16 can be bent, and the use of a high quality material such as nylon will allow the hinge 16 to "remember" the set position. Similarly, if the face plate of the mask is curved laterally, the birdge 11 may need to be bent as shown in FIG. 3 of the drawings so that the edges of the eyeglasses do not contact the face plate 28.

It should be noted that the hinge 16 must have considerable flexibility because the pantoscopic angle may need to vary widely. Because of this, the hinge 16 has been made around 1.5 mm thick with the device molded of nylon. On the other hand, the bridge 11 needs to be variable to only a small degree. Furthermore, it is important that the bridge 11 have sufficient rigidity to hold the lenses in place while a person is wearing the mask. Using nylon, it has been found that a thickness of slightly over 2 mm or so provides the adjustability with the rigidity needed. Obviously, different materials may require different dimensions to achieve the same results.

While one of the primary objects of the present invention is to provide the suction cup so the entire assembly can be very quickly and easily placed into a protective mask and removed therefrom, it will also be readily understood by those skilled in the art that the apparatus here disclosed can be used on a somewhat more permanent basis if desired. While the attaching of the suction cup 22 to the face plate 28 would normally be by simply wetting the suction cup, the application of glycerol as is well known in the art will allow the suction cup to remain on a somewhat more permanent basis.

It will therefore be understood that the present invention provides an extremely simple apparatus for supporting eyeglasses within a protective mask of virtually any design. The eyeglasses can be adjusted for pantoscopic angle as well as for curvature of the face plate; and, the eyeglasses can be raised or lowered with respect to the attaching means so the device is usable by virtually anyone regardless of the physiognomy of the person.

Since the eyeglasses are supported entirely from the face plate 28 by means of the releasable attaching means 22 and carrier 15, the frame 10 does not touch the wearer. Thus, there is no discomfort to the user, and no necessity for the conventional nose pads or the like.

It will of course be understood by those skilled in the art that the particular embodiment of the invention here presented is by way of illustration only, and is meant to be in no way restrictive; therefore, numerous changes and modifications may be made, and the full use of equivalents resorted to, without departing from the spirit or scope of the invention as defined in the appended claims.

I claim:

1. Eyeglass mounting means for supporting eyeglasses within a protective mask having a face plate, said eyeglasses comprising eyeglass frames including a bridge, a carrier, a hinge adjustably fixing said bridge of said eyeglass frames to said carrier, and releasable attaching means for selectively fixing said carrier to said face plate, the improvement wherein said releasable attaching means includes a suction cup selectively fixable to said face plate, and a stud carried by said suction cup, said carrier defining means for receiving said stud for fixing said carrier to said suction cup, said carrier defining at least one hole therethrough constituting said means for receiving said stud, said stud including external threads, said at least one hole having a diameter of approximately the minor diameter of said threads, said carrier being deformable by entry of said stud into said at least one hole, said at least one hole comprising a plurality of holes vertically distributed along said carrier, said stud being selectively receivable within each hole of said plurality of holes for vertical adjustment of said eyeglasses with respect to said attaching means.

2. Eyeglass mounting means as claimed in claim 1, said eyeglass frames further including two lens portions connected by said bridge, said hinge being fixed to said bridge, said hinge being arranged to allow said bridge to be angularly adjusted with respect to said carrier for adjusting the pantoscopic angle of said eyeglasses, said bridge being of such thickness as to allow angular adjustment between said lens portions and to hold said lens portions at the selected angle.

3. Eyeglass mounting means as claimed in claim 2, said hinge defining a plurality of legs extending from said hinge to said bridge, said legs being laterally spaced apart along said bridge.

* * * * *